United States Patent [19]
Raccouard

[11] Patent Number: 5,873,779
[45] Date of Patent: Feb. 23, 1999

[54] CASTING FOR A HEATING OR AIR CONDITIONING APPARATUS FOR A VEHICLE

[75] Inventor: Michel Raccouard, Maurepas, France

[73] Assignee: Valeo Climatisation, La Verriere, France

[21] Appl. No.: 889,285

[22] Filed: Jul. 8, 1997

[30] Foreign Application Priority Data

Jul. 9, 1996 [FR] France ................................ 96 08551

[51] Int. Cl.⁶ .................................................. B60H 1/02
[52] U.S. Cl. ........................ 454/158; 454/69; 454/156
[58] Field of Search .................................. 454/159, 156, 454/160, 158, 69

[56] References Cited

U.S. PATENT DOCUMENTS 2,640,407  6/1953  Aufiero .

FOREIGN PATENT DOCUMENTS 38 24 362    1/1990  Germany .
43 36 105    4/1995  Germany .
195 34 738   3/1996  Germany .

*Primary Examiner*—Harold Joyce
*Assistant Examiner*—Derek S. Boles
*Attorney, Agent, or Firm*—Morgan & Finnegan, L.L.P.

[57] ABSTRACT

A heating apparatus, or heating and air conditioning apparatus, for a motor vehicle has a casing which consists of four elements only, namely a casing body, a complementary housing carried on top of the body, a lower cover, and an end cover, the complementary housing and the two covers being assembled directly on the casing body.

8 Claims, 3 Drawing Sheets

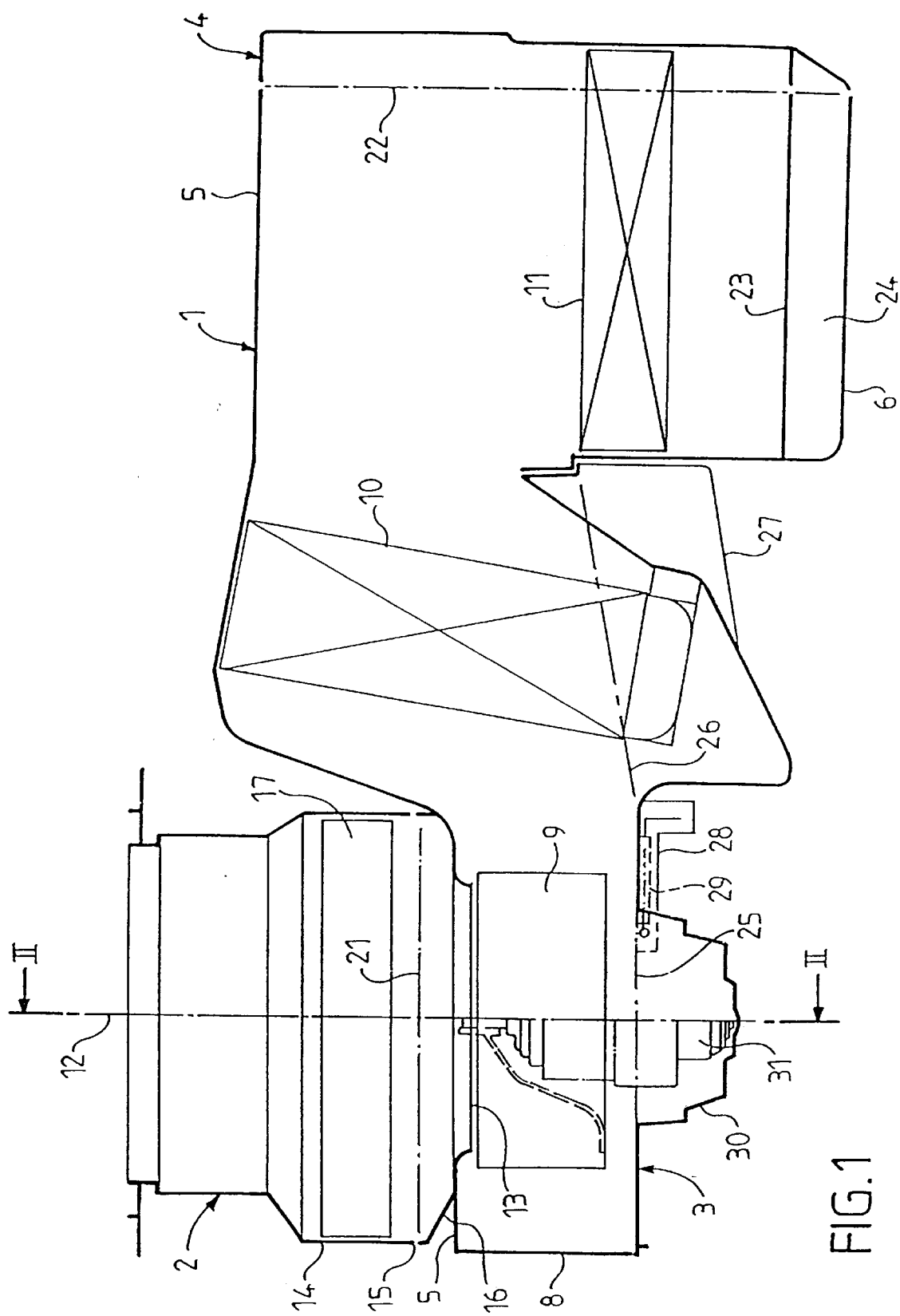

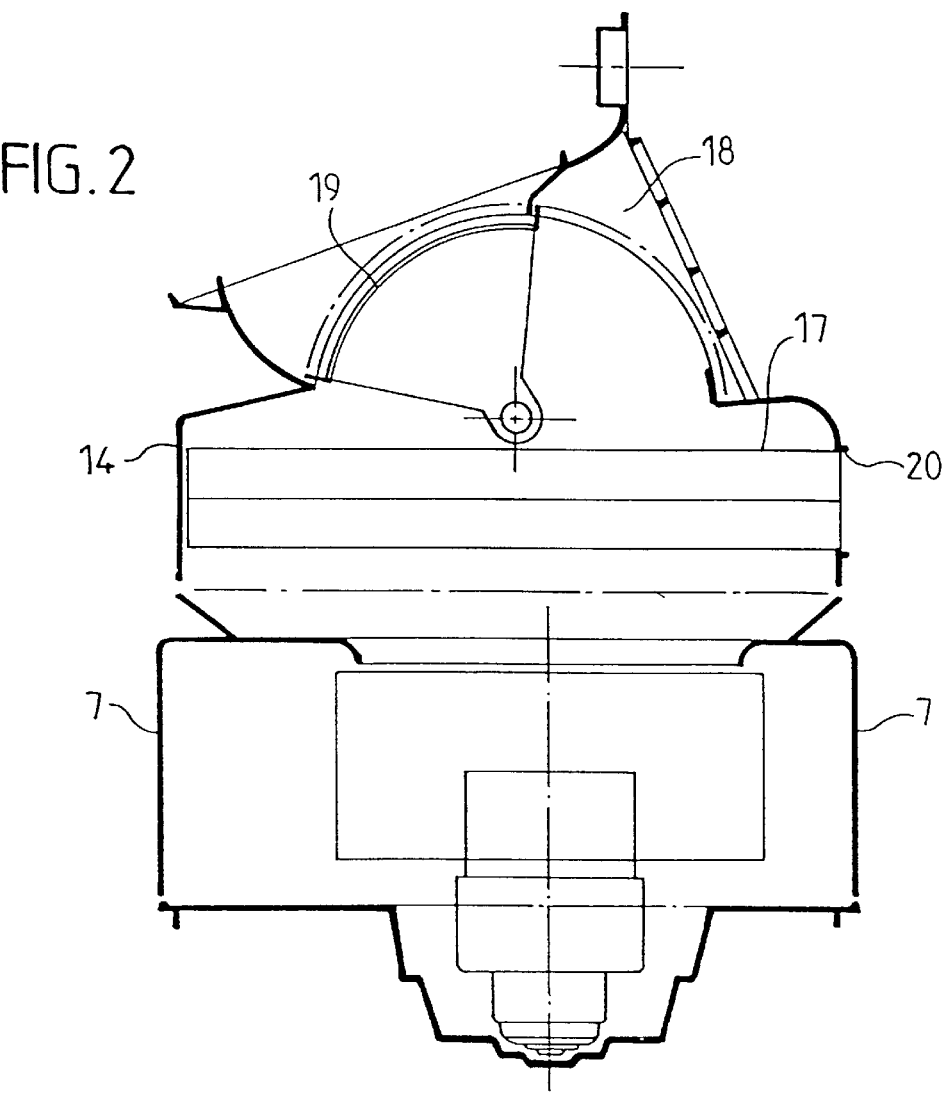
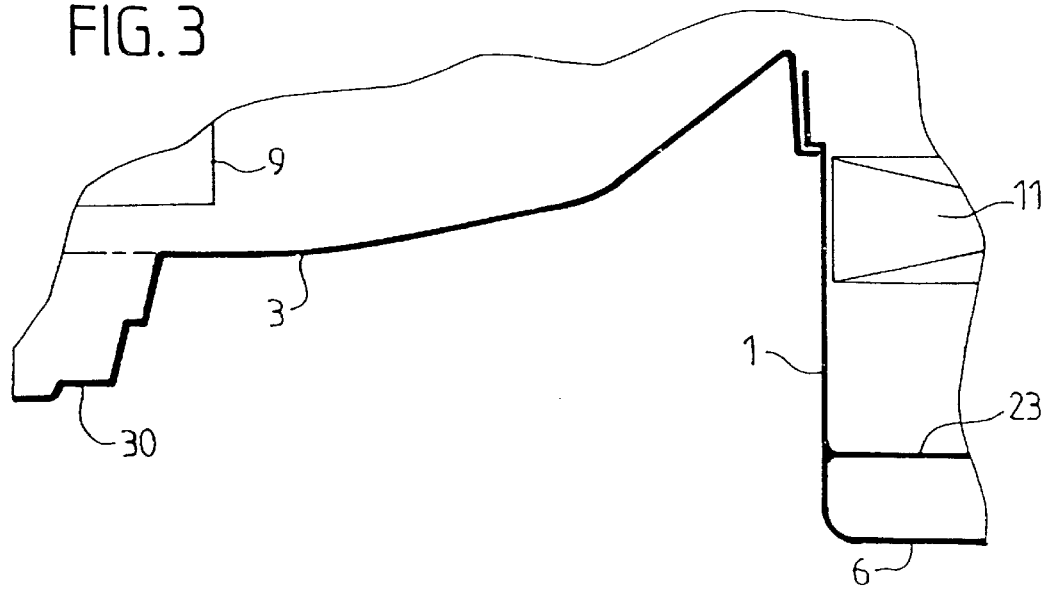

CASTING FOR A HEATING OR AIR CONDITIONING APPARATUS FOR A VEHICLE

FIELD OF THE INVENTION

This invention relates to casings for heating or air conditioning apparatus for vehicles. In particular, the invention relates to such a casing which comprises a plurality of elements which are assembled together so as to define within them successive parts of an air treatment train. The first of these parts is an inlet part, through which air is aspired from outside, this first part comprising an air filter and a motorised blower unit which includes a centrifugal blower, typically having a vertical axis, together with an air admission port communicating with the outside of the casing. The second, or intermediate, part of the casing, in the case of an air conditioning apparatus, includes a cooling device for the air. In the third part of the casing, the air is heated and then distributed, this third part including a heat source for heating the air and moveable elements for regulating the flow of air towards various output ports through which the air is delivered out of the casing.

BACKGROUND OF THE INVENTION

The various elements that have to be assembled together in order to fabricate a casing of the above type are normally eight in number, namely two elements for accommodating the filter, two elements for accommodating the motorised blower unit, two elements in which the intermediate part of the apparatus is contained, and finally two elements in which the heating and distribution part is contained.

DISCUSSION OF THE INVENTION

The object of the invention is to reduce the number of elements to be assembled in order to form such a casing, and thereby to reduce the cost of fabrication of the casing and the cost of assembling the heating or air conditioning apparatus.

According to the invention in a first aspect, a casing for the heating or air conditioning apparatus for a vehicle, comprising a plurality of elements which are assembled together so as to delimit successive parts of an air treatment train, namely: a first or aspiration part including an air filter and a motorised blower unit having a centrifugal blower on a vertical shaft, and communicating with the outside of the casing through an air admission port; a second or intermediate part, optionally comprising a cooling means for air conditioning purposes; and a third or heating and air distribution part, including a heat source and moveable members adapted to regulate the air streams towards various air outlet ports of the casing, is characterised in that the said parts of the casing are substantially aligned in a horizontal longitudinal direction, there being four of the said casing elements, namely:

(a) A body constituting the two opposed side walls, the top wall, a portion of the lower wall, and a first end wall of a main casing, the first end wall being adjacent to the said first or aspiration part of the casing, the main casing being aligned longitudinally in the said longitudinal direction and containing the said blower, for which it defines a volute and has an axial air inlet aperture formed in the said top wall, and the main casing also including the said second and third parts of the casing;

(b) A complementary housing containing the filter and defining the said admission port, being secured on the top of the said casing body so as to communicate with the main casing through the said air inlet aperture;

(c) A first cover which constitutes the remainder of the lower wall of the main casing, and which defines a lower part of the said first and second parts of the casing, the first cover containing part of the motor of the motorised blower unit and being secured to the bottom of the casing body; and (d) A second cover, which defines the second end wall of the main casing and which is fixed on the corresponding end of the casing body.

Each of the four said elements of the casing is preferably a single component moulded in a suitable plastics material.

Preferably, the said casing elements are so arranged that they can be fitted on to the casing body as follows: the complementary housing in a downward movement, the first cover in an upward movement, and the second cover by a movement in the longitudinal direction.

The complementary housing preferably has a side opening to enable the filter to be extracted and replaced in the complementary housing.

The complementary housing preferably has a vertical tubular wall surrounding the removable filter, the said vertical tubular wall being open at the bottom to enable a support for the filter to be introduced into the complementary housing before the latter is fitted on to the casing body.

Preferably, the first cover includes a hollow portion defined by a portion of the cover projecting downwardly in the vicinity of the blower, the said hollow portion defining a housing open upwardly so as to be in the path of a stream of air delivered by the blower, the said housing containing an electrical component which gives off heat and which regulates the speed of the blower.

According to the invention in a second aspect, a heating or air conditioning apparatus for a vehicle, constituting an air treatment train, includes: a first or air inlet part having an air filter, together with a motorised blower; unit having a centrifugal blower; a second, intermediate, part; and a third, heating and air distribution, part which includes a source of heat and moveable air control members, the apparatus including a casing according to the said first aspect of the invention, the casing containing the remaining components of the apparatus. In this second aspect, where the apparatus is an air conditioning apparatus, the intermediate part preferably includes a cooling means.

Further features and advantages of the invention will appear more clearly on a reading of the following detailed description of some preferred embodiments of the invention, which is given by way of non-limiting example only and with reference to the accompanying drawings.

BRIEF DESCRIPTION OF THE DRAWINGS

FIG. 1 is a diagrammatic view in longitudinal cross section, showing an air conditioning apparatus in accordance with the invention.

FIG. 2 is a diagrammatic view in cross section taken on the line II—II in FIG. 1.

FIG. 3 is a scrap view in longitudinal cross section showing a heating apparatus in accordance with the invention, though FIG. 3 is limited to the region in which this apparatus differs from the air conditioning apparatus shown in FIG. 1.

DESCRIPTION OF PREFERRED EMBODIMENTS OF THE INVENTION

Figure 5:
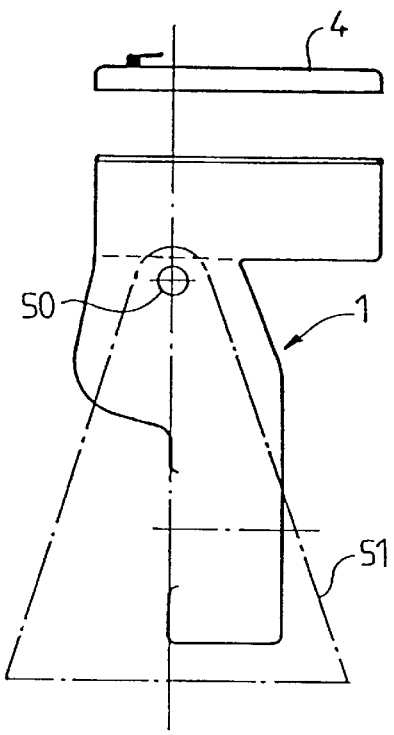
FIG. 5 illustrates diagrammatically a step in the assembly of the apparatus shown in FIG. 1.

Reference is first made to FIGS. 1 and 2. An air conditioning apparatus, generally shown in these Figures, is contained within a casing which consists of four casing elements assembled together. These casing elements comprise a casing body 1, a complementary housing 2, a lower cover 3 and an end cover 4. The complementary housing 2, the lower cover 3 and the end cover 4 are all fixed to the casing body 1. In the interests of easier interpretation of the drawings, the walls of these various elements of the casing are indicated in FIGS. 1 to 3 by thick lines, which are artificially spaced apart from each other in the junction zones between the casing elements.

The casing consists essentially of a main casing and the complementary housing 2. The main casing has a top wall 5, a lower wall, side walls 7 (FIG. 2), and a left-hand end wall 8 (with reference to FIG. 1). The casing body 1 includes the top wall 5, a portion 6 of the lower wall, the side walls 6 and the end wall 8. The main casing contains, substantially aligned with each other going from left to right in FIG. 1, an air blower rotor 9, an evaporator 10, and a heating radiator 11. The rotor 9 has a vertical axis 12, around which there is formed, in the top wall 5 of the casing body 1, an air feed aperture 13 for the blower. In addition, the side walls 7 and the end wall 8 constitute, around the blower rotor 9, a volute of the blower, which directs the air delivered radially by the blower in a direction towards the evaporator 10. The casing body 1 is open at its exit or right-hand end in a downward direction at a level lower than that of the blower 9 and evaporator 10, and the lower wall portion 6 is disposed below the radiator 11.

The main casing is completed by the lower cover 3, which constitutes the whole of the lower wall of the main casing apart from the wall portion 6 mentioned above; and by the end cover 4 which constitutes the right-hand end wall of the main casing (with reference to FIG. 1). The complementary housing 2 is fixed to the main casing above the top wall 5 of the casing body 1, in the region of the latter surrounding the air inlet aperture 13, so that the complementary casing 2 communicates through the aperture 13 with the blower in the main casing.

The complementary housing 2 has a vertical tubular wall 14 which is open at its lower end and has an annular bottom edge 15, which is joined edge to edge with an annular flange 16 of the casing body 1. The flange 16 projects upwardly from the top wall 5 of the body 1. The tubular wall 14 contains an air filter 17. Above the filter 17, the housing wall 14 has an aperture 18, FIG. 2, which is the air admission port through which air is introduced into the apparatus under the control of a pivoting control valve 19 of the drum type. This valve 19 is also mounted within the complementary housing 2, above the filter 17. A side aperture 20 is provided in the tubular wall 14 so as to give access to the filter 17, for periodic replacement of the latter during the working life of the apparatus. A support, not shown, for the filter can be introduced through the open bottom end of the housing 2, before the latter is fitted on to the casing body 1.

Just as the walls of the casing body 1 and the complementary housing 2 are joined together edge to edge in a horizontal plane 21 (FIG. 1), those of the casing body 1 and the cover 4 are also joined edge to edge, in this case in a vertical plane 22. These planes are represented in FIG. 1 in phantom lines. Besides the outer walls of the casing, the body 1 and the cover 4 define an intermediate baffle 23 which bounds an air distribution duct 24 downstream of the heating radiator 11.

The lower cover 3 is joined to the casing body 1 along a left-hand surface indicated in phantom lines in FIG. 1. This surface comprises a flat horizontal region 25 below the blower 9, and a flat inclined region 26 in the vicinity of the evaporator 10. The wall of the lower cover 3 is formed with two local hollow portions 27 and 28 which extend downwardly as shown in FIG. 1. The hollow portion 27 is located at the right hand end of the cover 3, and defines within it a space in which condensates formed in the evaporator 10 are collected, so that the hollow portion 27 is a condensate sump. The hollow portion 28 is in the vicinity of the blower 9, and it constitutes a housing for a resistor 29 which serves, in a manner known per se, to control the speed of the blower 9. The air stream produced by the blower enables the resistor to be cooled. The lower cover 3 also has a third local hollow portion 30, again extending downwardly and being in the form of body of revolution about the blower axis 12. The space within the hollow portion 30 contains part of the electric motor 31 which drives the blower 9. The motor 31 extends upwards out of the hollow portion 30, into the interior of the casing body 1.

In the right-hand part, with reference to FIG. 1, of the main casing, there are contained, besides the radiator 11, pivoting flap or butterfly type valves which are arranged to be controlled in the usual way so as to adjust the mass flow and temperature of the streams of air which are to be delivered into various regions of the cabin of the vehicle.

With reference now to FIG. 3, this shows, in cross section on the same plane of cross section as FIG. 1, i.e. the plane passing through the blower axis 14, part of a heating apparatus, the components of which are mostly identical with those of the air conditioning apparatus described above with reference to FIGS. 1 and 2. However, since in the heating apparatus there is no air conditioning function, the evaporator 10 is omitted, and that part of the air treatment apparatus that lies between the left-hand side containing the blower 9 and its motor 31, and the right-hand side containing the radiator 11, is a simple transition portion of the casing. The wall of the lower cover 3 is modified in this case so that it will channel the air in an appropriate way within this intermediate or transition part of the casing, having regard to the absence of the evaporator. In addition, the control resistor 29 and the corresponding housing 28 of the cover 3 are also omitted here. It is however possible of course to produce an apparatus which has an evaporator but no resistor, or vice versa.

Figure 4:
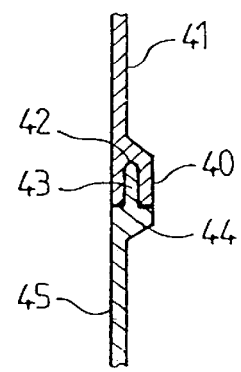
FIG. 4 is a scrap view in cross section, showing a junction zone between two elements of the casing of an air conditioning or heating apparatus in accordance with the invention.

With reference now to FIG. 4, this shows one example of cooperating profiles for the edge-to-edge junctions of the walls of two of the elements 1 to 4 of the casing (for example along the planes 21 and 22 in FIG. 1). In FIG. 4, the wall portions concerned are indicated by the reference numerals 41 and 45 respectively. The edge 40 of the first wall portion 41 is thickened and is formed with a groove 42, and the edge 44 of the wall portion 45 is also thickened and has a projecting tongue 43, which is received in the groove 42. This mating engagement between two abutted walls provides precise relative positioning. They can be fastened together in any known way, for example by adhesive bonding, welding, mechanical locking, or screw fastening.

The foregoing description relates to one particular orientation of the apparatus. Under certain conditions, it is however possible to operate the apparatus in different orientations.

Figure 6:
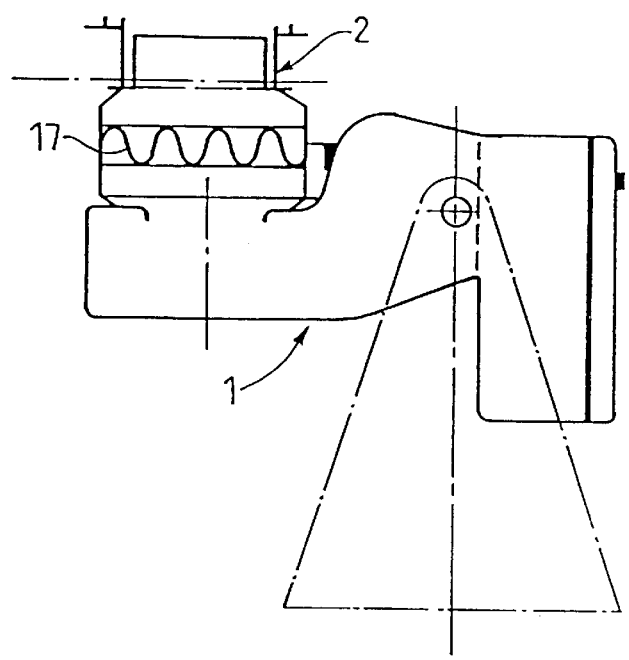
FIG. 6 is similar to FIG. 5, but shows a subsequent step in the assembly.
Figure 7:
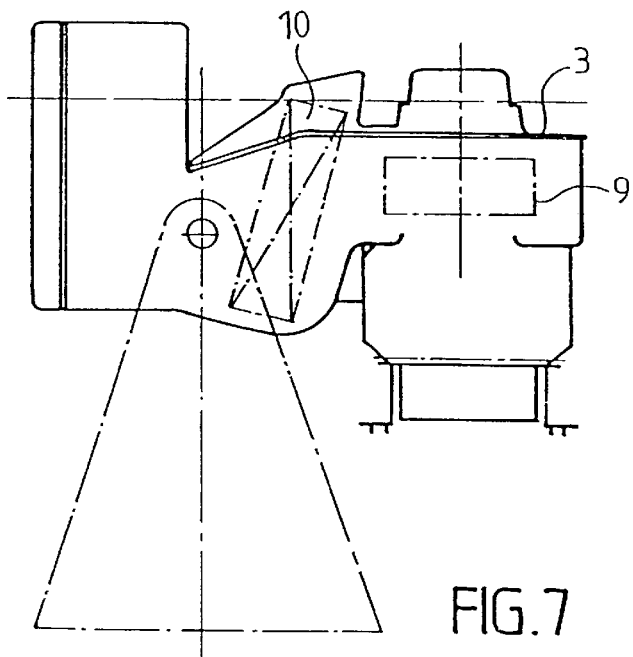
FIG. 7 is similar to FIGS. 5 and 6 but shows a step in the assembly subsequent to that of FIG. 6.

Reference is now made to FIGS. 5 to 7, in order to describe a simple way of assembling the apparatus of the kinds described above. In FIG. 5, the casing body 1 is held, empty, between two jaws 50 of an appropriate tool such as a vice or jig, so that its open end faces upwards. The radiator 11 and the valves for the heating and distribution part of the casing are then introduced through this open end into the casing body 1. The cover 4 is then moved downwardly so as to fit it in position on the body 1, after which the driving means for the valves are fitted. The body 1 is then pivoted through a quarter of a turn into the position shown in FIG. 6, which is also that seen in FIG. 1. The complementary housing 2, complete with its filter 17 and admission valve 19, is then moved downwardly into position on the body 1. The partly-assembled casing is now rotated through 180°, into the position shown in FIG. 7, in which the evaporator 10 is introduced from above. In the same way, the cover 3, carrying the blower unit consisting of the blower 9 and its motor 31, is fitted on the casing body 1, again in a simple downward movement.

What is claimed is:

1. A casing for a heating apparatus for a vehicle, the casing comprising a plurality of casing elements assembled together, the casing defining within it successive parts of air treatment means of the apparatus, namely a first air treatment part for aspiration of air into the apparatus, a second, intermediate, air treatment part joined to the said first air treatment part downstream of the latter, and a third air treatment part joined to the said second part downstream of the second part, the first air treatment part including an air filter and a motorised blower unit defining a vertical axis and comprising a centrifugal blower rotatable on said vertical axis, the said first part further having an air admission port communicating with the outside of the apparatus upstream of the filter, the said third air treatment part being a heating and air distribution part and including a source of heat, the casing further including a plurality of air outlet apertures, and the said heating and distribution part further including adjustable airflow regulating means downstream of the said heat source, for regulating the distribution of air towards the said air outlet apertures, wherein the said air treatment parts are substantially aligned in a horizontal longitudinal direction, there being four said casing elements, namely a casing body, a complementary housing, a first cover and a second cover, and wherein:

the casing has a top casing wall, a bottom casing wall, two opposed side casing walls, a first casing end wall adjacent to the said first air treatment part and a second casing end wall adjacent to the said third air treatment part, the said casing body and first and second covers defining together a main casing extending in a general longitudinal direction corresponding to the said horizontal longitudinal direction, the casing body including the said casing side walls, the top casing wall, a first portion of the bottom casing wall, and the first end casing wall, the said main casing containing the motorised blower unit and defining a volute for the latter and an air inlet aperture for the blower unit in the said top wall, the main casing further defining the said second and third air treatment parts;

the complementary housing contains the removable filter and defines the said air admission port, the complementary housing being open at the bottom and being fixed on top of the said casing body of the main casing, with the open body of the complementary housing in register with the said air inlet aperture;

the said first cover constitutes a second portion of the bottom casing wall, the bottom casing wall consisting of the said first and second portions thereof, the first cover delimiting the bottom of the said first and second air treatment parts, the motorised blower unit including a motor coupled to the blower and contained partly within the said first cover, the first cover being fixed on the bottom of the said casing body; and the second cover defines the said second end wall of the main casing, the main casing having an open downstream end, the second cover being fixed on the said downstream end.

2. A casing according to claim 1, wherein each said casing element is a single component moulded in plastics material.

3. A casing according to claim 1, wherein the said complementary housing is adapted to be fitted in place on the casing body in a downward vertical movement, the said first cover being adapted to be fitted on the casing body in an upward vertical movement, and the said second cover being adapted to be fitted on the casing body in a movement in the said longitudinal horizontal direction.

4. A casing according to claim 1, wherein the complementary housing has a side opening for extraction and replacement of a said filter.

5. A casing according to claim 1, wherein the complementary housing has a vertical tubular wall surrounding the filter, the said wall being open at the bottom whereby a support for the filter can be introduced through the bottom of the complementary housing before the complementary housing is fitted on the said casing body.

6. A casing according to claim 1, wherein the said first cover is formed with a hollow portion projecting downwardly and open at the top in the vicinity of the blower unit, to define a housing for an electrical blower speed control component, whereby air delivered by the blower unit can reach the said electrical component so as to cool the latter.

7. A vehicle heating apparatus comprising an air treatment train consisting of an upstream first air treatment part for drawing air into the apparatus and including an air filter and a motorised blower unit having a centrifugal blower, an intermediate second air treatment part, and a downstream third air treatment part for heating and distribution of air, the said third part including a source of heat and moveable airflow regulating members, wherein the apparatus includes a casing according to claim 1, with the remaining components of the said air treatment train being contained in the casing.

8. Apparatus according to claim 7, being an air conditioning apparatus and further including a cooling means contained in the said intermediate air treatment part of the casing.

* * * * *